(12) United States Patent
Ishizuka et al.

(10) Patent No.: US 6,631,047 B2
(45) Date of Patent: *Oct. 7, 2003

(54) INTERFERENCE DEVICE, POSITION DETECTING DEVICE, POSITIONING DEVICE AND INFORMATION RECORDING APPARATUS USING THE SAME

(75) Inventors: Kou Ishizuka, Omiya (JP); Hidejiro Kadowaki, Yokohama (JP); Naoki Kawamata, Utsunomiya (JP); Hiroyuki Hagiwara, Utsunomiya (JP); Makoto Takamiya, Tokyo (JP); Shigeki Kato, Utsunomiya (JP); Hiroyuki Shiomi, Utsunomiya (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/156,491

(22) Filed: Sep. 18, 1998

(65) Prior Publication Data

US 2003/0133219 A1 Jul. 17, 2003

(30) Foreign Application Priority Data

Sep. 22, 1997 (JP) .............................................. 9-256786
Sep. 22, 1997 (JP) .............................................. 9-256788

(51) Int. Cl.$^7$ ............................. G11B 5/596; G01B 9/02
(52) U.S. Cl. ............................... 360/77.03; 360/78.11; 356/499; 356/521; 356/494
(58) Field of Search ............................. 360/75, 77.03, 360/78.11; 369/102, 44.23, 44.37, 53.25, 53.28, 53.29, 53.38, 53.39, 109.01, 110.02, 110.03, 110.04, 112.12, 112.17, 118; 356/345, 373, 375, 356, 493, 498, 499, 521, 494

(56) References Cited

U.S. PATENT DOCUMENTS

| 3,716,845 A | 2/1973 | Chaffin, III .......... 340/173 LM |
| 5,283,434 A | 2/1994 | Ishizuka et al. ........ 250/237 G |
| 5,390,022 A | 2/1995 | Ishizuka et al. ............ 356/356 |

OTHER PUBLICATIONS

"Flight Height Monitoring By Differential Interferometer", IBM Technical Disclosure Bulletin, vol. 34, No. 10A, pp. 173–174 (Mar. 1992).

*Primary Examiner*—Andrew L. Sniezek
(74) *Attorney, Agent, or Firm*—Fitzpatrick, Cella, Harper & Scinto

(57) ABSTRACT

An apparatus having a first system for forming a composite light beam of two light beams to be made to interfere with each other, a splitting member for amplitude-splitting the composite light beam into three or more split light beams in the same area, and a second system for obtaining interference light beams of different phases from the plurality of split light beams. Also, an apparatus for effecting information recording on a hard disc drive device comprising an (i) optical system for splitting a light beam into two light beams, causing one of the two light beams to be condensed and reflected by the side of an arm for a recording reading head in the hard disc drive device, and superposing the condensed and reflected light beam on the other light beam to thereby obtain a composite light beam, (ii) a splitting member for amplitude-splitting the composite light beam into three or more split light beams in the same area, (iii) an optical member for obtaining interference light beams of different phases from the plurality of split light beams, (iv) light receiving elements for detecting respective ones of the interference light beams of different phases, (v) a control system for effecting the positioning of the arm on the basis of the result of the detection by each of the light receiving elements, and (vi) a signal writing-in system for writing a signal into a hard disc through the recording reading head each time the arm is positioned.

13 Claims, 8 Drawing Sheets

U.S. PATENT DOCUMENTS

| | | |
|---|---|---|
| 5,448,358 A | 9/1995 | Ishizuka et al. ............. 356/373 |
| 5,481,106 A | 1/1996 | Nyui et al. .............. 250/237 G |
| 5,483,332 A | 1/1996 | Takamiya et al. ........... 356/28.5 |
| 5,483,377 A | 1/1996 | Kaneda et al. .............. 359/566 |
| 5,498,870 A | 3/1996 | Ishizuka ................. 250/237 G |
| 5,502,466 A | 3/1996 | Kato et al. .................. 356/356 |
| 5,557,396 A | 9/1996 | Ishizuka et al. ............ 356/28.5 |
| 5,569,913 A | 10/1996 | Ishizuka et al. ......... 250/237 G |
| 5,621,527 A | 4/1997 | Kaneda et al. .............. 356/356 |
| 5,629,793 A | 5/1997 | Takamiya et al. ........... 359/278 |
| 5,640,239 A | 6/1997 | Takamiya et al. ........... 356/345 |
| 5,663,794 A | 9/1997 | Ishizuka .................... 356/356 |
| 5,666,196 A | 9/1997 | Ishii et al. ................... 356/356 |
| 5,680,211 A | 10/1997 | Kaneda et al. .............. 356/356 |
| 5,737,070 A | 4/1998 | Kato ......................... 356/28.5 |
| 5,737,116 A | 4/1998 | Kadowaki et al. ........... 359/359 |
| 5,754,282 A | 5/1998 | Kato et al. .................. 356/28.5 |
| 5,774,218 A | 6/1998 | Takamiya et al. ........... 356/356 |
| 5,796,470 A | 8/1998 | Ueda et al. ................. 356/28.5 |
| 5,815,267 A | 9/1998 | Kato et al. ................... 356/356 |
| 5,831,720 A | 11/1998 | Ishida et al. ................ 356/28.5 |
| 5,880,839 A | 3/1999 | Ishizuka et al. ............. 356/356 |
| 5,930,066 A * | 7/1999 | Ishizuka et al. ......... 360/77.03 |
| 6,473,184 B1 * | 10/2002 | Ishizuka et al. ............. 356/499 |

* cited by examiner

INTERFERENCE DEVICE, POSITION DETECTING DEVICE, POSITIONING DEVICE AND INFORMATION RECORDING APPARATUS USING THE SAME

BACKGROUND OF THE INVENTION

1. Field of the Invention

This invention relates to an interference device, a position detecting device, a positioning device and an information recording apparatus using the same. This invention can be applied particularly well to a position detecting device for detecting the positional fluctuation of an object in non-contact such as an interference length measuring device for an object like a hard disc drive magnetic head, a positioning device and a manufacturing apparatus for a hard disc drive device (hereinafter referred to as HDD) used in a computer utilizing the same, and above all, an apparatus for writing a servo track signal into a hard disc in the HDD.

2. Related Background Art

FIG. 1A of the accompanying drawings shows an illustration of an apparatus for writing a servo track signal into a hard disc in the HDD according to the conventional art.

In FIG. 1A, HDD designates a hard disc drive device, HD denotes hard discs, SLID designates a slider, ARM1 denotes a magnetic head arm, VCM designates a voice coil motor, OHD denotes the spindle of the hard discs HD, and O designates the rotary shaft of the magnetic head arm ARM1.

A magnetic recording medium is deposited by evaporation on the surface of each hard disc. The hard discs HD are normally rotated as a unit at a high speed about the spindle OHD, and a magnetic head is disposed in proximity to the surface of each hard disc HD. The magnetic head is incorporated in the portion of a substantially rectangular parallelopiped called the slider SLID mounted on the tip end of each arm portion of the magnetic head arm ARM1 having the center of rotation O outside the hard discs HD, and is relatively movable substantially in a radial direction on the hard discs HD by rotatively driving the arm ARM1 by the voice coil motor VCM.

Consequently, magnetic information can be written or read at any position (track) on the surfaces of the hard discs by the rotated hard discs HD and the arcuately moved magnetic head.

Now, a magnetic recording system onto the surface of the hard disc is such that each hard disc is splitted into a plurality of circular ring-shaped tracks of different radii concentric with the center of rotation OHD of the hard discs, and further each of the circular ring-shaped tracks in turn is splitted into a plurality of arcs and finally, magnetic information is recorded and reproduced on the plurality of arcuate areas time-serially along the circumferential direction.

Now, as the recent tendency, an increase in the recording capacity of the hard disc is required and there is a desire for the higher density of recorded information onto the hard disc. As means for the higher density of recorded information onto the hard disc, it is effective to narrow the width of the tracks splitted into concentric circles and improve the recording density in the radial direction.

The recording density in the radial direction is expressed by track density TPI (track/inch) per length of an inch, and at present it is of the order of 10000 TPI. This means that the track interval is about 3 $\mu$. To form such a minute track pitch, it is necessary to position the magnetic head at resolving power (0.05 $\mu$) of about 1/50 of the track width in the radial direction of the hard disc HD and write a servo track signal in advance into the hard disc. The important technique here is to successively write servo track signals into the hard disc while effecting positioning of high resolving power within a short time.

PROD designates a push rod, ARM2 denotes an arm for the push rod PROD, MO designates a positioning control motor, RE denotes a rotary encoder for detecting the amount of rotation of the rotary shaft of the motor MO, SP designates a signal processor for analyzing the detection output from the rotary encoder RE, and producing a positioning command signal to the servo track signal writing-in position of the magnetic head, and MD denotes a motor driver for driving the motor MO by the command signal of the signal processor SP. These together form a rotary positioner RTP.

According to the conventional art, as shown in FIG. 1A, the cylindrical surface of the push rod PROD was pushed against the side of the magnetic head arm ARM1 (the arm portion for the magnetic head for the underside of the lowermost hard disc), and the arm ARM2 was rotated to thereby sequentially finely feed and position the magnetic head arm through the push rod PROD while taking feedback control by the system of the rotary encoder RE, the signal processor SP and the motor driver MD, and servo track signals from a signal generator SG were successively written in from the magnetic head. In order to ensure the contact at this time, some electric current was usually supplied to the voice coil motor VCM and the push rod PROD was also pushed from the head arm ARM1 side.

Recently, supposing more highly accurate positioning, a non-contact method of highly accurate measuring the movement of the magnetic head arm by optical means has been desired without adopting a system for mechanically pushing the magnetic head arm in which the vibration by the rotation or the like of the hard disc may be transmitted to the motor MO. FIG. 1B of the accompanying drawings shows an example of such an apparatus.

In FIG. 1B, HeNe designates a laser light source, M1 and M2 denote mirrors, BS designates a beam splitter, CC denotes a retroreflector such as a corner cube provided on the magnetic head arm ARM1, and PD designates a light receiving element.

In this apparatus, the laser light source HeNe, the mirrors M1 and M2, the beam splitter BS and the retroreflector CC together constitute a Michelson type interferometer, and the interference light of light beams L1 and L2 which have passed the retroreflector CC and the mirrors M1 and M2, respectively, is detected by the light receiving element PD to thereby obtain the positional information of the magnetic head arm ARM1. On the basis of the obtained detection signal, a signal processor SP produces a command and controls an electric current flowing from a voice coil motor driver VCMD to a voice coil motor VCM to thereby directly move the magnetic head arm and provide appropriate control.

In such an apparatus, however, it is necessary to place the retroreflector CC such as a corner cube on the magnetic head arm, and this is liable to lead to the problem of troubles such as the securement of space and the mounting and dismounting of the retroreflector, and the aggravation of the control characteristic by an increase in weight.

SUMMARY OF THE INVENTION

In view of the above-described examples of the conventional art, the present invention has as an object thereof to provide a position detecting device and a positioning device capable of detecting the position of an object and position the object in non-contact at high reliability and with high accuracy and high resolving power, an interference device making the same realizable and an information recording apparatus using the same.

Other objects of the present invention will become apparent from the following description of some embodiments of the invention.

DESCRIPTION OF THE PREFERRED EMBODIMENTS

Figure 1A:
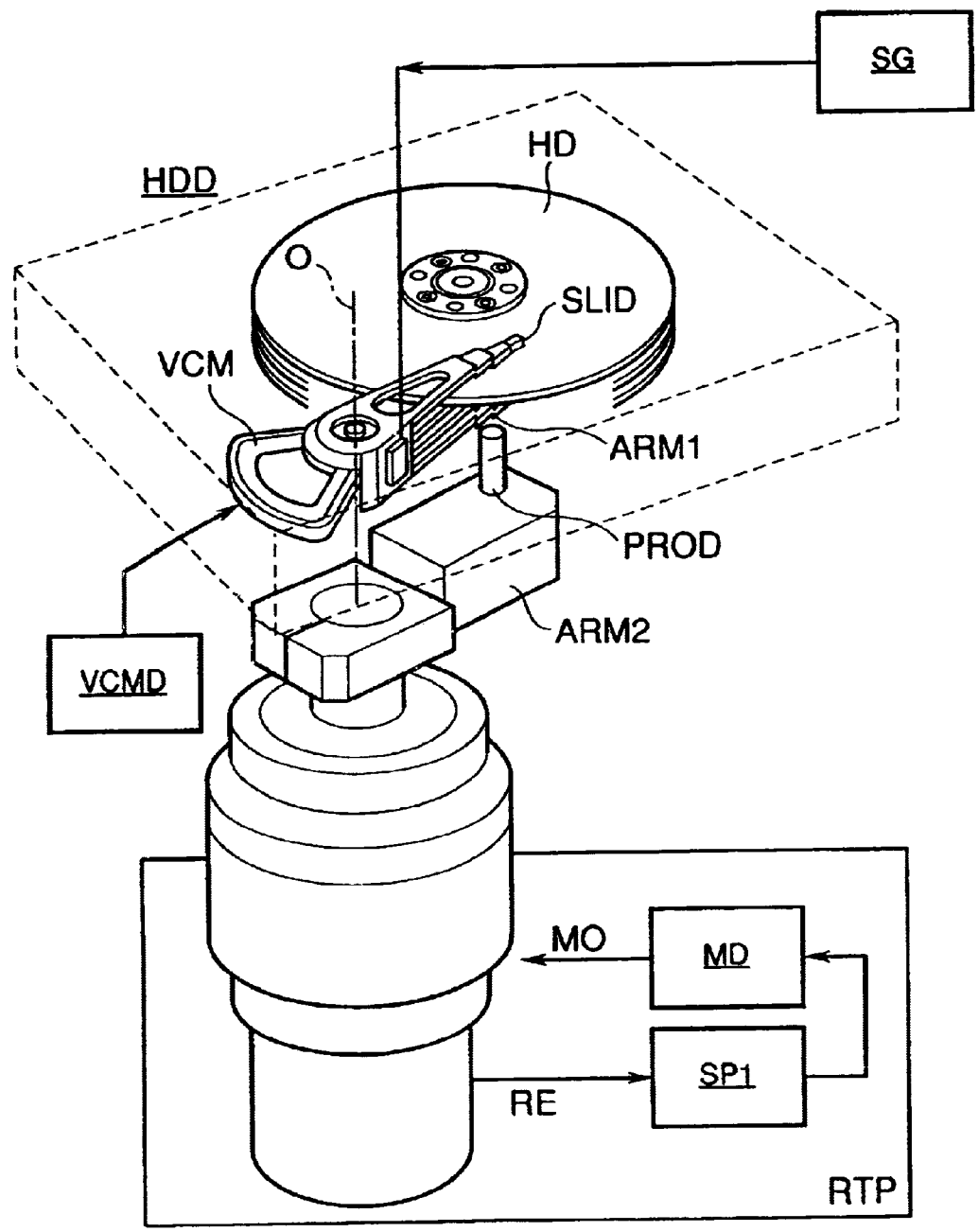
FIG. 1A is an illustration of a prior-art servo track signal writing-in apparatus using a hard disc drive device and a push rod.
Figure 1B:
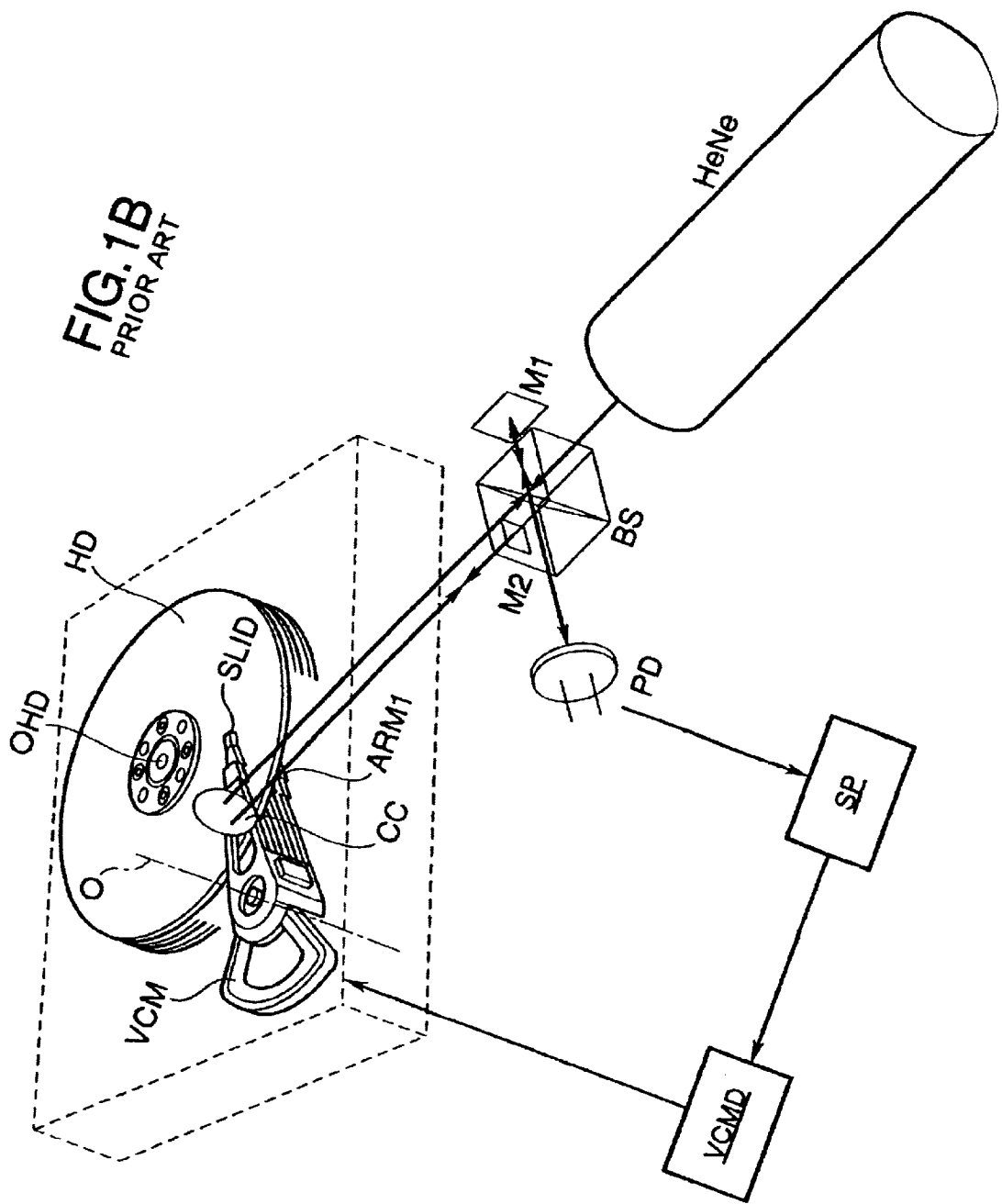
FIG. 1B is an illustration of a prior-art servo track signal writing-in apparatus using a hard disc drive device and a retroreflector interference length measuring machine.
Figure 2A:
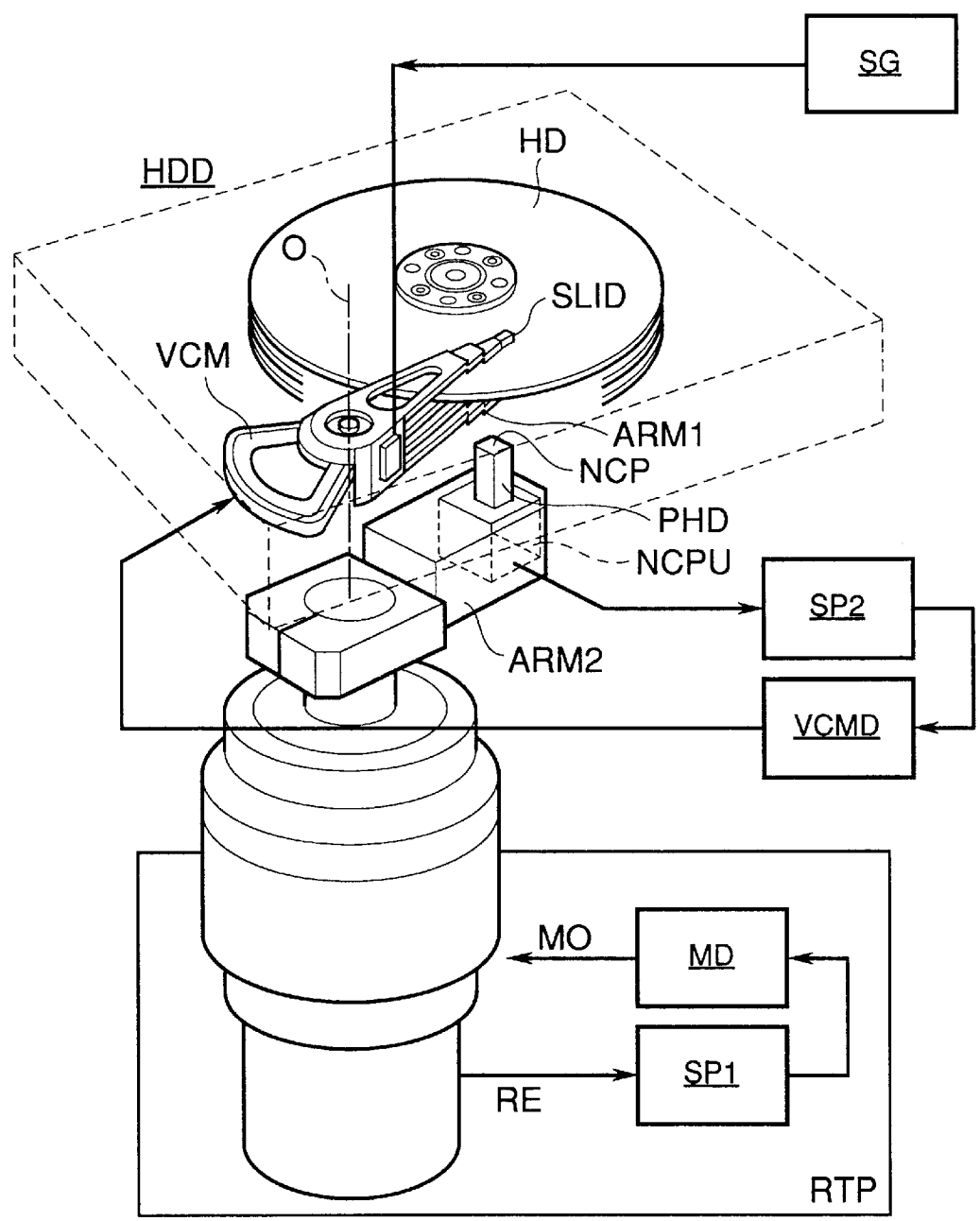
FIG. 2A schematically shows the construction of a servo track signal writing-in apparatus according to Embodiment 1 of the present invention.

FIG. 2A schematically shows the construction of a servo track signal writing-in apparatus according to a first embodiment of the present invention. In FIG. 2A, members similar to those in the aforedescribed conventional art are given the same reference characters.

A hard disc drive device HDD has mounted thereon a magnetic head arm ARM1 having a rotary shaft O outside a hard disc HD, and a slider SLID mounted on the tip end thereof is disposed with a gap of 0.5 $\mu$m (or less) in opposed relationship with the surface of the hard disc, and is arcuately moved by the rotation of the magnetic head arm ARM1. The rotation of the magnetic head arm is effected by an electric current being supplied to a voice coil motor VCM.

Such an apparatus is disposed at a spatially proper position, as shown in FIG. 2A, relative to the hard disc drive device HDD comprising the hard disc HD, the slider SLID, the magnetic head arm ARM1, the voice coil motor VCM, etc.

SG designates a signal generator for generating a servo track signal to be written into the hard disc, and this servo track signal is written into the hard disc HD through the magnetic head of the slider SLID.

A position detecting unit NCPU is provided on a support arm ARM2, and the tip end portion of an optical probe NCP may be inserted in a slot-like opening (not shown) in the base plate of the hard disc drive device HDD and is disposed near the side of the magnetic head arm ARM1. The support arm ARM2 is disposed so as to be rotatably movable by a rotary shaft coaxial with the center of rotation O of the magnetic head arm ARM1. The rotated position of the position detecting unit NCPU is detected by a high resolving power rotary encoder RE mounted on the rotary shaft of the support arm ARM2, and on the basis of this detection data, a signal processor SP1 rotatively drives a motor MO through a motor driver MD. By the feedback control of this form, the position detecting unit NCPU is rotatively positioned.

The position detecting unit NCPU is comprised of an optical type sensor unit as will be described hereinafter.

Figure 2B:
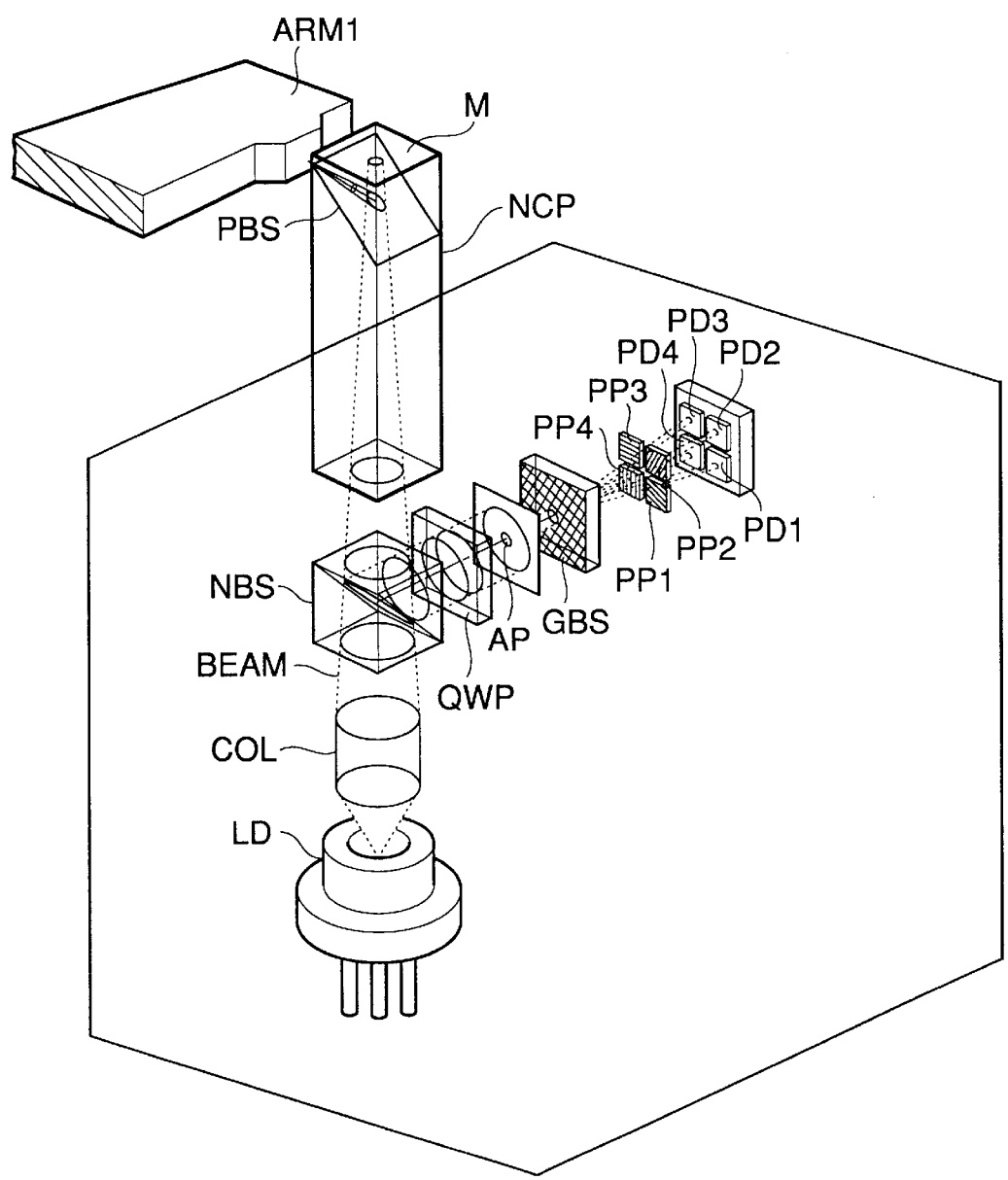
FIG. 2B is an illustration of the optical type non-contact distance sensor unit of the servo track signal writing-in apparatus shown in FIG. 2A.

FIG. 2B is an illustration of the construction of an optical system for illustrating the optical type sensor unit. The optical type sensor unit is comprised of a multimode laser diode LD, a non-polarizing beam splitter NBS, a probe-like polarizing prism PBS, a reference reflecting surface M, a quarter wavelength plate QWP, a light beam diameter limiting opening AP, a light beam amplitude splitting diffraction grating GBS, polarizing plates PP1–PP4, photoelectric elements PD1–PD4, etc.

Divergent light from the multimode laser diode LD is made into a loosely condensed light beam BEAM by a collimator lens COL, is transmitted through the non-polarizing beam splitter NBS, and then enters the probe-like polarizing prism PBS of an optical probe NCP which is formed of a light-transmitting substance, and is splitted into each polarized component by the light splitting surface of the probe-like polarizing prism PBS. The reflected S-polarized light beam is condensed and illuminated near a beam waist on the side of the head arm ARM1 disposed in a space spaced apart by about 300 $\mu$m from the end surface of the probe-like polarizing prism PBS (here, the arm portion for the magnetic head for the underside of the lowermost hard disc), and the reflected light becomes a divergent spherical wave and returns along the original optical path, and is returned to the light splitting surface of the probe-like polarizing prism PBS. A P-polarized light beam transmitted through the probe-like polarizing prism PBS is condensed and illuminated on the reflecting deposited film of the end surface at a position deviating from the beam waist (short of the beam waist), and the reflected light returns along the original optical path, and is returned to the light splitting surface of the probe-like polarizing prism PBS. The optical path lengths of the two optical paths are set so that the difference between the optical path lengths thereof may be within the coherent distance of the light source, that is, the optical path lengths may be equal to each other.

Specifically, for example, the shape is given as follows. The width of the probe-like polarizing prism PBS formed of glass is of the order of 2 mm, and the light beam reflected by the polarizing prism PBS travels by 1 mm through the glass and travels by 0.3 mm through the air, and is illuminated on the head arm side ARM1. Consequently, the reciprocative wave motion optical path length L1 from the polarizing prism to the reflecting surface is L1=(1×1.5+ 0.3)×2=3.6. On the other hand, the light beam transmitted through the polarizing prism PBS travels by 1.2 mm through the glass and is illuminated on the end surface of the glass. Consequently, the reciprocative wave motion optical path length L2 is L2=(1.2×1.5)×2=3.6. Here, the refractive index of the glass is 1.5.

Next, the condensed position (beam waist) of the light beam is set to a position of 0.3 mm after the light beams have emerged from the polarizing prism. Thereupon, the position of the wave source of the divergent spherical wave reflected from the head arm side and the reference reflecting surface looks deviated in the direction of the optical axis. Assuming that the interior of the probe-like polarizing prism is looked into from the light source side, the condensing point (wave source) on the head arm side is seen at a position of $L1'=(1+0.3\times1.5)=1.45$ from the splitting surface of the polarizing prism. The position of the divergent spherical wave source from the reference reflecting surface is seen at a position of $L2'=1.2\times2-1.45=0.95$ from the splitting surface of the polarizing prism. However, the two positions are positions seen in the glass. Consequently, it follows that the two divergent spherical wave sources deviate by 0.5 mm from each other (a difference in the imaging optical path length is created), and when the two light beams are superposed one upon the other, the wavefronts do not completely coincide with each other, and if the two polarized lights are put together, there will be obtained interference fringes like concentric circles. In that case, when the phases of the two wavefronts are fluctuated by the relative movement of the head arm, the interference fringes like concentric circles look gushing out of and inhaled into the center. However, these concentric circular interference fringes are as small as about 0.5 mm in the amount of deviation of the two divergent spherical waves in the direction of the optical axis and therefore, in the central portion thereof, there is widely obtained an interference fringe portion of substantially one color (the same phase). Consequently, an appropriate opening AP is provided so as to take out only the substantially one color portion, thereby taking out some light beam. After this, the interference fringes can be handled as a substantially plane wave.

Now, the two light beams combined together by the probe-like polarizing prism PBS are linearly polarized lights orthogonal to each other and therefore, actually they do not intactly interfere with each other, and even if they are detected, they do not become light-and-shade signals. The two light beams reflected by the non-polarizing beam splitter NBS, when transmitted through the quarter wavelength plate QWP, the linearly polarized lights orthogonal to each other are converted into circularly polarized lights of opposite directions, and when the vibration surfaces of the two are vector-combined, they are converted into a rotating linearly polarized light by the fluctuation of the phase difference between the two.

This rotating linearly polarized light passes through the aforementioned opening AP, whereafter it is amplitude-splitted into four light beams (here, ±first-order diffracted lights created in each of two directions orthogonal to each other) by a phase diffraction grating having staggered grating structure (i.e., a phase diffraction grating having diffracting action in each of two directions orthogonal to each other). All of these light beams have their natures such as shape, intensity irregularity and defect entirely equally splitted by the amplitude division from the same area and therefore, even if for some reason or other, the interference fringes become not one color or are reduced in contrast, the influences thereof will all become equal. Particularly, the reflected light from the head arm side has its wavefront disturbed by minute uneven structure and has intensity irregularity created strongly, but the ways of disturbance of the wavefronts and the states of intensity irregularity of the four light beams become equal. The phase diffraction grating is designed to avoid the creation of O-order light to the utmost.

The light beams splitted into four are transmitted through polarizing plates (analyzers) disposed with their polarization azimuths deviated by 45° from each other, whereby it is converted into interference light in which the timing of light and shade deviates by 90° in terms of phase. The reductions in contrast by the influences of the disturbance of the wavefront and the intensity irregularity are all equally influenced. The light beams of light and shade are received by respective light receiving elements PD1, PD2, PD3 and PD4.

The signals of the light receiving elements PD1 and PD2 having a phase difference of 180° therebetween are differentially detected, whereby a DC component (in which is contained a reduction in contrast or the like by the disturbance or the like of the wavefront) is substantially removed. This is an A phase signal. Likewise, the signals of the light receiving elements PD3 and PD4 having a phase difference of 180° therebetween are differentially detected, and a DC component is substantially removed. This is a B phase signal. The A and B phase signals have a phase difference of 90° therebetween, and the Lissajous waveform observed by an oscilloscope becomes circular. The amplitude of the Lissajous waveform (the size of the circle) fluctuates by the minute unevenness of the head arm side, but the central position thereof does not fluctuate. Consequently, no error is not essentially created in the phase detection (measurement of the relative distance). Specifically, these A and B phase signals have the value of their DC component O binarized as a threshold value by a binarizing circuit, not shown, but even if an amplitude fluctuation occurs to the original A and B phase signals, the DC component remains O and does not fluctuate and therefore, no fluctuation occurs to the phase of the binarized signal and consequently, by the use of this binarized signal of which the phase has been stabilized, highly accurate position detection can be executed by the signal processor SP2.

Also, by the light being condensed and illuminated on the head arm side, the influence of the fluctuation (one-color deviation) of the interference state by the relative angle deviation (alignment deviation) of the head arm side is avoided. That is, by being condensed and illuminated, even if there is alignment deviation, the main emergence azimuth of the divergent spherical wave only somewhat deviates and the eclipse of the spherical wave itself is avoided and also, the overlapping state of the wavefronts of two divergent spherical waves does not change and therefore, an interference state is stably obtained. Consequently, the present position detecting sensor operates as an interference type position detecting sensor which does not require the adjustment of the head arm side and the illuminating light beam and which is very easy to handle.

Also, although the illuminating position deviation (parallel deviation) is not concerned with the phase deviation of the divergent spherical wave, it becomes the fluctuation of the amplitude of the interference signal due to a change in the minute uneven state of the head arm conforming to the illuminating position. However, the central position of the Lissajous waveform does not fluctuate and therefore, no error is not essentially created in the phase detection.

The positional relation between the head arm and the position detecting sensor is such that both of them are rotatively moved about rotary shafts coaxial with each other and they do not deviate from each other as long as the distance between the two is kept constant. However, realistically there can be no completely coaxial shafts and therefore, by a shaft deviation error, there occurs a relative positional relation (angular deviation and parallel deviation) during the rotation of the two. However, as described above, no problem essentially arises even if alignment deviation or parallel deviation occurs.

The signal to finally be detected has its principles based on the interference measured length by the reciprocative optical path and therefore is a sine wave-like signal having a half of the wavelength of the light source as its period. When a laser diode of a wavelength 0.78 µm is used, there is obtained a sine wave signal having a period of 0.39 µm (i.e., a sine wave each time the spacing between the side of the head arm ARM1 and the optical probe NCP varies by 0.39 µm), and the fluctuation of the relative distance can be detected by counting the wave number. Further, two phases (A and B phases) of sine wave signals having a phase difference of 90° therebetween are obtained in the afore-described manner and therefore, by counting the signals after electrically splitting the signal by a well known electrical phase splitting device, the relative position deviation of more minute resolving power can be detected. If the signal is electrically splitted into 4096 pieces, the relative position deviation can be detected up to minimum 0.095 mm.

The signal processor SP2 supplies a control current to a head arm driving motor (voice coil) VCM through a motor driver VCMD so that the relative position deviation detected in this manner may become zero. By doing so, for example, by the above-mentioned wavelength, the position of the magnetic head arm ARM1 relative to the optical probe NCP can be stably held (apply servo) at the order of several times as great as ±0.095 nm.

On the other hand, if use is made of a highly accurate rotary positioner RTP containing therein a rotary encoder RE producing a signal of 81000 sine waves/rotation as a specific numerical value, and capable of splitting it into 2048 and positioning them, an optical probe NCP as a position detecting sensor mounted near the side of the head arm having a radius of 30 mm can be positioned with resolving power several times as great as ±1.4 nm.

Since the stabilization of the relative position of the position detecting sensor itself is about several times as great as ±0.095 nm as described above, the positioning resolving power of the two as combined together is at the level of the performance of the highly accurate rotary positioner itself.

By adding the servo for keeping the relative position of the end surface of the head arm constant through the position detecting sensor to the highly accurate rotary positioner as described above, stable positioning accuracy can be provided without any disturbance such as the vibration as by the rotation of the hard disc transmitted to the highly accurate positioner through the head arm ARM1. As regards the writing-in of signals, the arm ARM2 is rotated by the motor MO to thereby move the optical probe NCP while taking feedback control by the system of the rotary encoder RE, the signal processor SP and the motor driver MD, and the magnetic head arm ARM1 is displaced by the system of the signal processor SP2, the motor driver VCMD and the head arm driving motor VCM so as to negate the displacement at this time, to thereby position the magnetic head arm while sequentially finely feeding it, and servo track signals from the signal generator SG are successively written in from the magnetic head.

The interference between the reflected light beam from the side of the head arm and the reflected light beam from the reference reflecting surface is obtained within the coherence distance of the light source. A single-mode laser diode has a long coherence distance, but may sometimes cause mode hop to give rise to a phenomenon that the interference phase hops and therefore, in the present embodiment, a multimode laser is used and the optical path lengths are made substantially equal, and the multimode laser is used at an optical path length difference less than the coherence distance. As a specific example of numerical values, the central wavelength λ0 of the light source is λ=780 nm, and the full width of a half value of the multimode spectrum envelope is Δλ=6 nm, and generally the full width of the coherence distance is given by splitting the square of λ0 by Δλ and therefore is about ±50 µm centering around the equal optical path length.

Also, the laser diode generally has its wavelength fluctuated by the fluctuation of the ambient temperature. Taking a laser diode of a central wavelength 780 nm and a temperature coefficient 0.66 nm/° C. as an example, when the optical path length difference ΔL is ΔL=50 µm, the deviation of a measured value by the temperature fluctuation of 1° C. is of the order of ±5 nm.

If the distance is kept constant near a coherent peak, the optical path length difference can be realized at ±10 µm and the measurement error in that case is ±1 nm. This value is sufficient accuracy as a servo track writer.

Also, a laser interference length measuring apparatus is not stable in its signal output due to fluctuation or the like when the optical paths thereof are generally separate and constructed while being exposed in the air. In the present embodiment, however, most of the interference optical path is a common optical path and is separated into two optical paths near the tip end of the probe-like polarizing prism, but is minute and in a glass medium and is constructed so that the influence of fluctuation or the like may become very small.

The main effects of the above-described Embodiment 1 will be mentioned below.

1. Since the side of the head arm can be position-measured completely in non-contact, the resolving power, accuracy and stability of servo writing are improved.

2. Since laser interference length measurement is the principle, resolving power and accuracy are very high.

3. Since the minute uneven surface of the side of the head arm is directly measured, flexibility is high and any special optical element or the like need not be added to the hard disc side.

4. Since the bad influence of the alignment deviation between the side of the head arm and the illuminating light beam upon the measuring system is small, the positioning adjustment accompanying mounting, dismounting and interchange is easy and the servo writing work onto the hard disc can be effected efficiently.

5. Since an equal optical path length interference system is utilized, relatively high accuracy is ensured even under temperature fluctuation.

6. Since most of the interference optical path is a common optical path and most of the optical path after splitted is in glass, the reduction in accuracy by environmental fluctuations is small.

Figure 3:
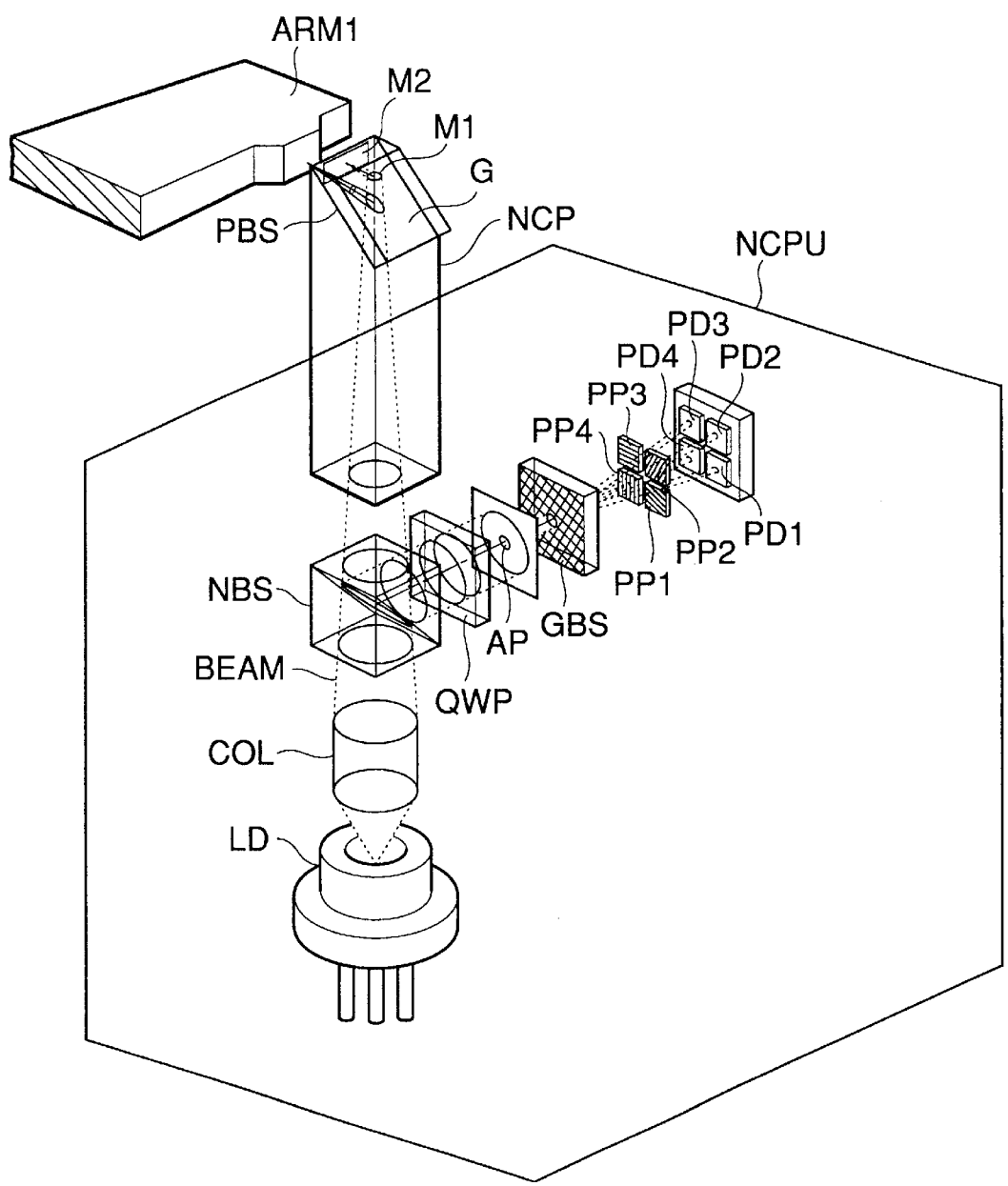
FIG. 3 is an illustration of the optical type non-contact distance sensor unit of a servo track signal writing-in apparatus according to Embodiment 2 of the present invention.

FIG. 3 is an illustration of the construction of an optical system according to Embodiment 2 in which the probe-like polarizing prism has been changed in shape to cope with a case where the side of the head arm is proximate to the surface of the hard disc. In the other points, the construction of Embodiment 2 is similar to that of Embodiment 1 and therefore need not be shown and described.

In the present embodiment, a parallel glass plate G with reflecting film is joined to that portion of the probe-like polarizing prism PBS which is immediately behind the splitted surface thereof, and a P-polarized light beam transmitted through the splitted surface of the probe-like polarizing prism PBS is reflected by reflecting film M1, and is again transmitted through the polarizing film and impinges on partial reflecting film M2 provided on the side of the optical probe NCP, and returns along the original optical path. An S-polarized light beam reflected by the splitted surface of the probe-like polarizing prism PBS goes out of the optical probe NCP as in the aforedescribed embodiment, and is condensed and illuminated on the side of the head arm ARM1, and the reflected light thereof returns along the original optical path.

By adopting this construction, the distance (see FIG. 2A) between the tip end of the optical probe NCP and the underside of the lowermost hard disc HD can be widened, and measurement also becomes possible on the side of a magnetic head arm of a type in which the magnetic head arm is proximate to the surface of the hard disc. It will be most effective if as shown in FIG. 3, the end portion of the parallel glass plate G is worked into 45°.

Figure 4:
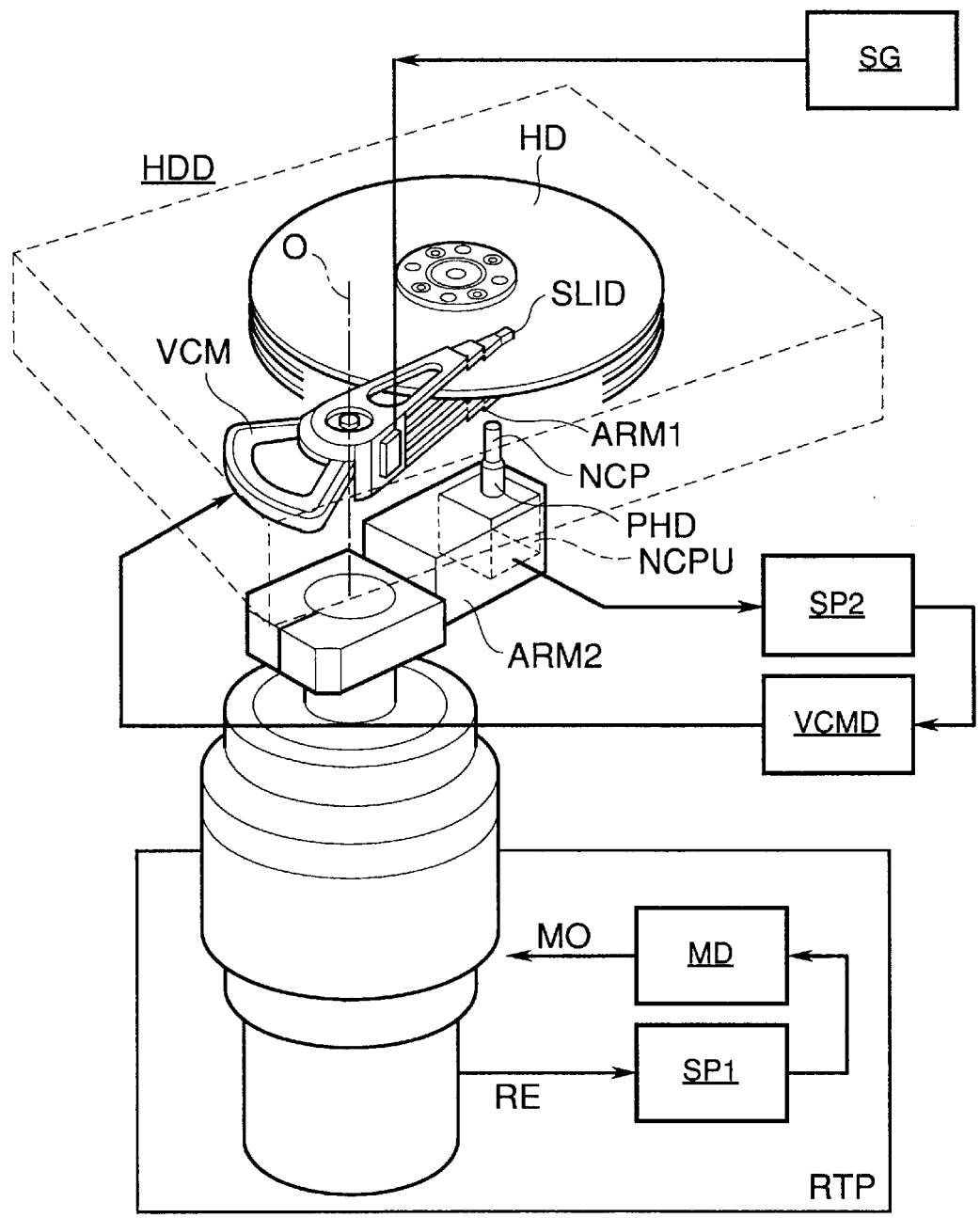
FIG. 4 schematically shows the construction of a servo track signal writing-in apparatus according to Embodiment 3 of the present invention.

FIG. 4 schematically shows the construction of a servo track signal writing-in apparatus according to Embodiment 3 of the present invention. In FIG. 4, members similar to those in the aforedescribed embodiments are given the same reference characters. Although partly repeated, the present embodiment will hereinafter be described in detail.

A hard disc drive device HDD has mounted thereon a magnetic head arm ARM1 having a rotary shaft O outside hard discs HD, and a slider SLID mounted on the tip end thereof is disposed with a gap of 0.5 $\mu$m (or less) in opposed relationship with the surface of the hard discs, and is arcuately moved by the rotation of the magnetic head arm ARM1. The rotation is effected by an electric current being supplied to a voice coil motor VCM.

Such an apparatus is disposed at a spatially proper position as shown in FIG. 4 relative to the hard disc drive device HDD comprising the hard discs HD, the slider SLID, the magnetic head arm ARM1, the voice coil motor VCM, etc.

SG designates a signal generator for generating servo track signals to be written into the hard discs, and the servo track signals are written into the hard discs HD through the magnetic head of the slider SLID.

A position detecting unit NCPU is provided on a support arm ARM2, and the tip end portion of an optical probe NCP is inserted in the slot-like opening (not shown) of the base plate of the hard disc drive device HDD and is disposed near the side of the magnetic head arm ARM1. The support arm ARM2 is disposed so as to be rotatively movable by a rotary shaft coaxial with the center of rotation O of the magnetic head arm ARM1. The rotated position of the position detecting unit NCPU is detected by a high resolving power rotary encoder RE mounted on the rotary shaft of the support arm ARM2, and on the basis of this detection data, a signal processor SP1 rotatively drives a motor MO through a motor driver MD. The position detecting sensor unit NCPU is rotatively positioned by this form of feedback control.

The position detecting unit NCPU is comprised of an optical type sensor unit as will hereinafter be described.

Figure 5:
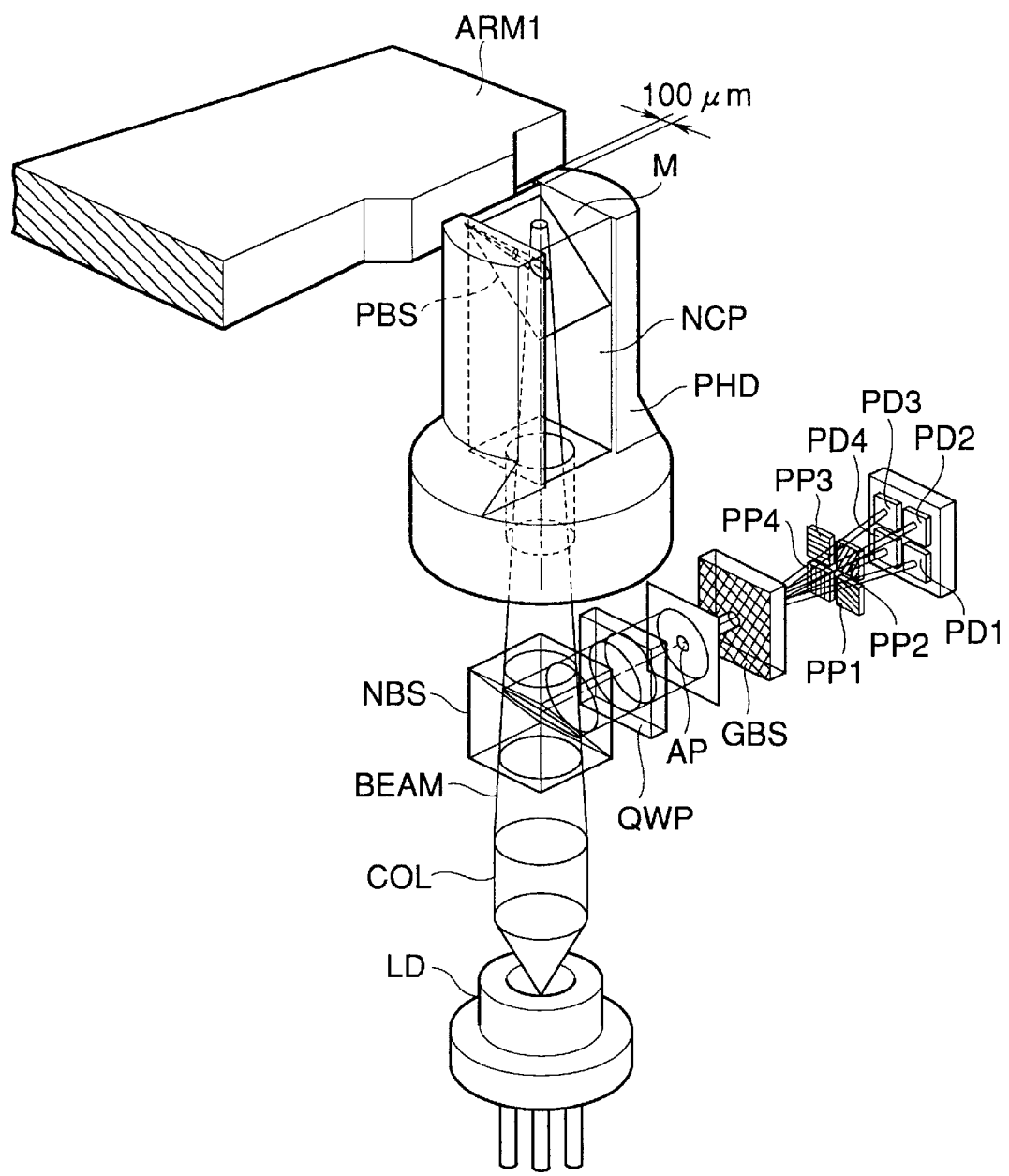
FIG. 5 is an illustration of the optical type non-contact distance sensor unit and probe holder of the servo track signal writing-in apparatus shown in FIG. 4.

FIG. 5 is an illustration of the construction of an optical system for illustrating the optical type sensor unit. The optical type sensor unit is comprised of a multimode laser diode LD, a non-polarizing beam splitter NBS, a probe-like polarizing prism PBS, a probe holder PHD, a reference reflecting surface M, a quarter wavelength plate QWP, a light beam diameter limiting opening AP, a light beam amplitude splitting diffraction grating GBS, polarizing plates PP1–PP4, photoelectric elements PD1–PD4, etc.

Divergent light from the multimode laser diode LD is made into a loose condensed light beam BEAM by a collimator lens COL, and is transmitted through the non-polarizing beam splitter NBS and then impinges on the probe-like polarizing prism PBS of the optical probe NCP which is formed of a light transmitting substance, and is splitted into each polarized component by the light splitting surface of the probe-like polarizing prism PBS. A reflected S-polarized light beam is condensed and illuminated near the beam waist on the side of the head arm ARM1 (here, the arm portion for the magnetic head for the underside of the lowermost hard disc) disposed in a space spaced apart by about 300 $\mu$m from the end surface of the probe-like polarizing prism PBS, and the reflected light becomes a divergent spherical wave and returns along the original optical path, and is returned to the light splitting surface of the probe-like polarizing prism PBS. A P-polarized light beam transmitted through the probe-like polarizing prism PBS is condensed and illuminated at a position deviating from the beam waist (a state short of the beam waist) on the reflecting deposited film of the end surface, and the reflected light returns along the original optical path and is returned to the light splitting surface of the probe-like polarizing prism PBS. The respective optical path lengths of the two optical paths are set so that the optical path length difference therebetween may be within the coherence distance of the light source, that is, the optical path lengths may be substantially equal to each other.

Specifically, for example, the shape is given as follows. The width of the probe-like polarizing prism PBS formed of glass is of the order of 2 mm, and the light beam reflected by the polarizing prism PBS travels by 1 mm through the glass and travels by 0.3 mm through the air, and is illuminated on the head arm side ARM1. Consequently, the reciprocative wave motion optical path length L1 from the polarizing prism to the reflecting surface is L1=(1×1.5+0.3)×2=3.6. On the other hand, the light beam transmitted through the polarizing prism PBS travels by 1.2 mm through the glass, and is illuminated on the end surface of the glass. Consequently, the reciprocative wave motion optical path length L2 is L2=(1.2×1.5)×2=3.6. So, the refractive index of the glass was 1.5.

Next, the condensed position (beam waist) of the light beam is set to a position of 0.3 mm after the light beam has emerged from the polarizing prism. Thereupon, the position of the wave source of a divergent spherical wave reflected from the head arm side and the reference reflecting surface looks deviated in the direction of the optical axis. Assuming that the interior of the probe-like polarizing prism is looked into from the light source side, the condensing point (wave source) on the head arm side is seen at a position of L1'=(1+0.3×1.5)=1.45 from the splitting surface of the polarizing prism. The position of the divergent spherical wave source from the reference reflecting surface is seen at a position of L2'=1.2×2-1.45=0.95 from the splitting surface of the polarizing prism. However, the both positions are positions seen in the glass. Consequently, the two divergent spherical wave sources deviate by 0.5 mm from each other in the glass (an imaging optical path length difference is created), and when the two light beams are superposed one upon the other, the wavefronts do not completely coincide with each other, and if the two polarized lights are put together, there will be obtained concentric circular interference fringes. In that case, when the phases of the wavefronts of the two are fluctuated by the relative movement of the head arm, the concentric circular interference fringes look gushing out of or inhaled into the center. However, as regards these concentric circular interference fringes, an interference fringe portion of substantially one color (the same phase) is widely obtained because the amount of deviation between the two divergent spherical waves in the direction of the optical axis is as small as about 0.5 mm. Consequently, an appropriate opening AP is provided so as to take out only the substantially one color portion to thereby take out some of the light beam. Thereafter, it can be handled as a substantially plane wave.

Now, the two light beams combined together by the probe-like polarizing prism PBS are linearly polarized lights orthogonal to each other and therefore, actually they do not intactly interfere with each other, and even if they are detected, they do not become light and shade signals. The two light beams reflected by the non-polarizing beam splitter NBS, when transmitted through the quarter wavelength plate QWP, are converted from linearly polarized lights orthogonal to each other into circularly polarized lights of opposite directions, and when the vibration surfaces of the two are vector-combined, they are converted into a linearly polarized light rotated by the fluctuation of the phase difference between the two.

This rotated linearly polarized light passes through the aforementioned opening AP, whereafter it is amplitude-splitted into four light beams (here, ±first-order diffracted lights created in each of two directions orthogonal to each other) by a phase diffraction grating having staggered grating structure (i.e., a phase diffraction grating having diffracting action in each of two directions orthogonal to each other). By the amplitude division from the same area, any of the light beams is splitted entirely equally in its natures such as shape, intensity irregularity and defect and therefore, even if the interference fringes become not one color or are reduced in contrast for some reason or other, the influences thereof all become equal. Particularly, the reflected light from the head arm side has its wavefront disturbed by minute uneven structure and intensity irregularity occurs strongly, but the ways of disturbance and the states of intensity irregularity of the wavefronts of the four light beams are equal. The phase diffraction grating is designed to avoid the creation of O-order light to the utmost at the same time.

The light beams splitted into four are transmitted through polarizing plates (analyzers) having their polarization azimuths disposed with a deviation of 45° with respect to one another, whereby it is converted into interference lights in which the timing of light and shade deviates by 90° in terms of phase. The reductions in contrast by the influences of the disturbance of the wavefront and the intensity irregularity are all equally influenced. The respective light and shade light beams are received by the respective light receiving elements PD1, PD2, PD3 and PD4.

The signals of the light receiving elements PD1 and PD2 having a phase difference of 180° therebetween are differentially detected, whereby a DC component (including a contrast reduction by the disturbance or the like of the wavefront) is substantially eliminated. This is an A phase signal. Likewise, the signals of the light receiving elements PD3 and PD4 having a phase difference of 180° therebetween are differentially detected, whereby a DC component is substantially removed. This is a B phase signal. The A and B phase signals have a phase difference of 90° therebetween, and the Lissajous waveform observed by means of an oscilloscope becomes circular. The amplitude of the Lissajous waveform (the size of the circle) is fluctuated by the minute unevenness of the head arm side, but its central position is not fluctuated. Consequently, essentially no error occurs to the phase detection (the measurement of the relative distance). Specifically, these A and B phase signals have the value of their DC component O binarized as a threshold level by a binarizing circuit, not shown, but even if an amplitude fluctuation occurs to the original A and B phase signals, the DC component remains O and is not fluctuated and therefore, no fluctuation occurs to the phase of the binarized signal and consequently, by the use of this binarized signal stable in phase, highly accurate position detection can be executed by the signal processor SP2.

Also, the light is condensed and illuminated on the head arm side to thereby avoid the influence of the fluctuation (one-color deviation) of the interference state by the relative angle deviation (alignment deviation) of the head arm side. That is, by the light being condensed and illuminated, even if there is alignment deviation, the main emergence azimuth of the divergent spherical wave only somewhat deviates and the eclipse of the spherical wave itself is avoided, and also the overlapping state of the wavefronts of the two divergent spherical waves does not change and therefore, the interference state is obtained stably. Consequently, the sensor operates as an interference type position detecting sensor in which the adjustment of the head arm side and the illuminating light beam is unnecessary and which is very easy to handle.

Also, the illuminating position deviation (parallel deviation) is not concerned in the phase deviation of the divergent spherical wave, but becomes the fluctuation of the interference signal amplitude due to a minute change in the uneven state of the head arm conforming to the illuminating position. However, the central position of the Lissajous waveform does not fluctuate and therefore, essentially no error occurs to the phase detection.

The positional relation between the head arm and the position detecting sensor does not deviate as long as they are rotatively moved about the rotational axes thereof coaxial with each other and the distance between the two is kept constant. Realistically, however, the two axes cannot be completely coaxial with each other and therefore, due to an axis deviation error, the relative positional relation causes angular deviation and parallel deviation when the two are being rotated. However, as described above, essentially no problem will arise even if alignment deviation and parallel deviation occur.

The finally detected signal has its principle based on the interference measured length by the reciprocative optical path and therefore is a sine wave-like signal having a half of the wavelength of the light source as its period. When a laser diode of a wavelength 0.78 $\mu$m is used, there is obtained a sine wave signal having a period of 0.39 $\mu$m (i.e., a sine wave each time the spacing between the side of the head arm ARM1 and the optical probe NCP changes by 0.39 $\mu$m), and by counting the wave number, the fluctuation of the relative distance can be detected. Further, sine wave signals having a phase difference of 90° therebetween are obtained in two phases (A and B phases) in the aforedescribed manner and therefore, by electrically splitting the signals by a well known electrical phase splitting device and thereafter counting them, relative positional deviation of finer resolving power can be detected. If the signals are electrically splitted into 4096 pieces, the relative positional deviation can be detected up to minimum 0.095 nm.

The signal processor SP2 supplies a control current to the head arm driving motor (voice coil) VCM through the motor driver VCMD so that the relative positional deviation detected in this manner may become zero. By doing so, for example, in the above-mentioned wavelength, the position of the magnetic head arm ARM1 relative to the optical probe NCP can be held (servo can be applied) stably at about several times as great as ±0.095 nm.

On the other hand, if use is made of a highly accurate rotary positioner RTP containing therein a rotary encoder RE producing a signal of 8100 sine waves/rotation as a specific numerical value and capable of splitting it into 2048 and positioning them, the optical probe NCP as a position detecting sensor mounted near the head arm side of a radius 30 mm can be positioned with resolving power several times as great as ±1.4 nm.

The stabilization of the relative position of the position detecting sensor itself is at about several times as great as ±0.095 nm as described above and therefore, the positioning resolving power resulting from the two having been put together becomes about equal to the performance of the highly accurate rotary positioner itself.

By servo for keeping the relative position of the end surface of the head arm constant being added to the highly accurate rotary positioner through the position detecting sensor, as described above, stable positioning accuracy can be obtained without any disturbance such as the vibration by the rotation or the like of the hard disc being transmitted to the highly accurate positioner through the head arm ARM1. The writing-in of signals is done by rotating the arm ARM2 by the motor MO to thereby move the optical probe NCP while taking feedback control by the system of the rotary encoder RE, the signal processor SP and the motor driver MD, and displacing the magnetic head arm ARM1 by the system of the signal processor SP2, the motor driver VCMD and the head arm driving motor VCM so as to negate the displacement at this time to thereby position the magnetic head arm while sequentially minutely feeding it, and writing the servo track signals from the signal generator SG in succession by the magnetic head.

The interference between the reflected light beam from the head arm side and the reflected light beam from the reference reflecting surface is obtained within the coherence distance of the light source. A single mode laser diode has a long coherence distance but may cause mode hop and in some cases, the phenomenon of the interference phase thereof flying may happen and therefore, in the present embodiment, a multimode laser is used to make the optical path lengths substantially equal, and is used at an optical path length difference less than the coherence distance. As a specific example of numerical values, assuming that the central wavelength $\lambda 0$ of the light source is $\lambda 0=780$ nm and the multimode spectrum envelope half value full width is $\Delta\lambda=6$ nm, generally the full width of the coherence distance is given by the square of $\lambda 0$ having been splitted by $\Delta\lambda$ and therefore, is about ±50 $\mu$m centering around the equal optical path lengths.

Also, the laser diode is generally fluctuated in wavelength by the fluctuation of the ambient temperature. Taking a laser diode having a central wavelength 780 nm and a temperature coefficient 0.06 nm/° C. as an example, when the optical path length difference is $\Delta L=50$ $\mu$m, the deviation of the measured value by a temperature fluctuation of 1° C. is of the order of ±5 nm.

If the distance is kept constant near the peak of coherency, an optical path length difference of ±10 $\mu$m can be realized, and the measurement error in that case is ±1 nm. This value is sufficient accuracy as a servo track writer.

Also, when a laser interference length measuring apparatus is generally constructed with optical paths separated and exposed in the air, the signal output thereof is not stable due to fluctuation or the like. In the present embodiment, however, most of the interference optical paths is a common optical path, and although the common optical path is separated into two optical paths near the tip end of the probe-like polarizing prism, it is minute and within a glass medium, and design is made such that the influence of fluctuation or the like becomes very small.

Here, the probe-like polarizing prism PBS is joined to a probe holder PHD and is fixed onto the rotary positioner arm ARM2 with the position detecting device body.

The probe holder PHD is inserted in a portion of a cylindrical metallic member which is hollowed, and is adhesively secured in such a manner that the parallelopiped-like polarizing prism PBS is sandwiched from its opposite sides by a structure of a D-shaped cross-section. A hole extends like a tunnel through a portion of the pedestal of the probe holder PHD through which the light passes. The light beam emergence side end surface of the member of the substantially D-shaped cross-section of the probe holder PHD is so shaped and disposed as to fly out of the light beam emergence surface of the polarizing prism PBS by the order of 100 $\mu$m as a specific example of numerical value.

When as previously described, the spacing between the light beam emergence surface of the polarizing prism PBS and the side of the head arm ARM1 satisfies the range of the order of 0.3 mm±0.05, a periodic signal of ½ of the wavelength of the light source is obtained in conformity with that spacing, but when the position detecting device and the head arm are disposed in a space at first, the relative positional relation therebetween is indefinite, and the distance between the light beam emergence surface of the polarizing prism PBS and the side of the head arm ARM1 must be set by some means so as to satisfy the range of the order of 0.3 mm±0.05. At that time, a case where the two contact with each other is also supposed. However, by adopting the probe holder PHD of holding guide structure like that of the present embodiment, the probe-like polarizing prism PBS itself which is an optical member can be prevented from contacting and being damaged and creating positional deviation.

Also, the probe holder can be made very small and therefore can be made into a size equal to that of the push rod (PROD) of the servo track signal writing-in apparatus of the conventional art push rod type.

The main effects of the above-described Embodiment 3 will be mentioned below.

1. The head arm side can be position-measured completely in non-contact, and even if the head arm side should contact, the optical member does not contact and is not damaged and therefore, the resolving power, accuracy, stability and safety of servo writing are improved. Particularly, when the head arm side contacts, it contacts at its two D-shaped end portions and therefore, the strength thereof can be kept. Also, the glass polarizing prism PBS is held from its opposite sides through an adhesive agent and therefore, even if stress such as heat or vibration is applied thereto, it is difficult for such a force that will bend the glass polarizing prism to act, and safety is ensured.

2. The laser interference length measurement is the principle and therefore, the resolving power and accuracy are very high.

3. The minute uneven surface of the head arm side is directly measured and therefore, flexibility is high and any special optical element or the like need not be added to the hard disc side.

4. The bad influence of the alignment deviation between the head arm side and the illuminating light beam upon the measuring system is small and therefore, positioning adjustment accompanying mounting, dismounting and interchange is easy, and the servo writing work onto the hard disc can be effected efficiently.

5. The equal optical path length interference system is utilized and therefore, relatively high accuracy is ensured even under temperature fluctuations.

6. Most of the interference optical paths is a common optical path and most of the optical paths after splitted is within glass and therefore, the reduction in accuracy by environmental fluctuations is small.

Figure 6:
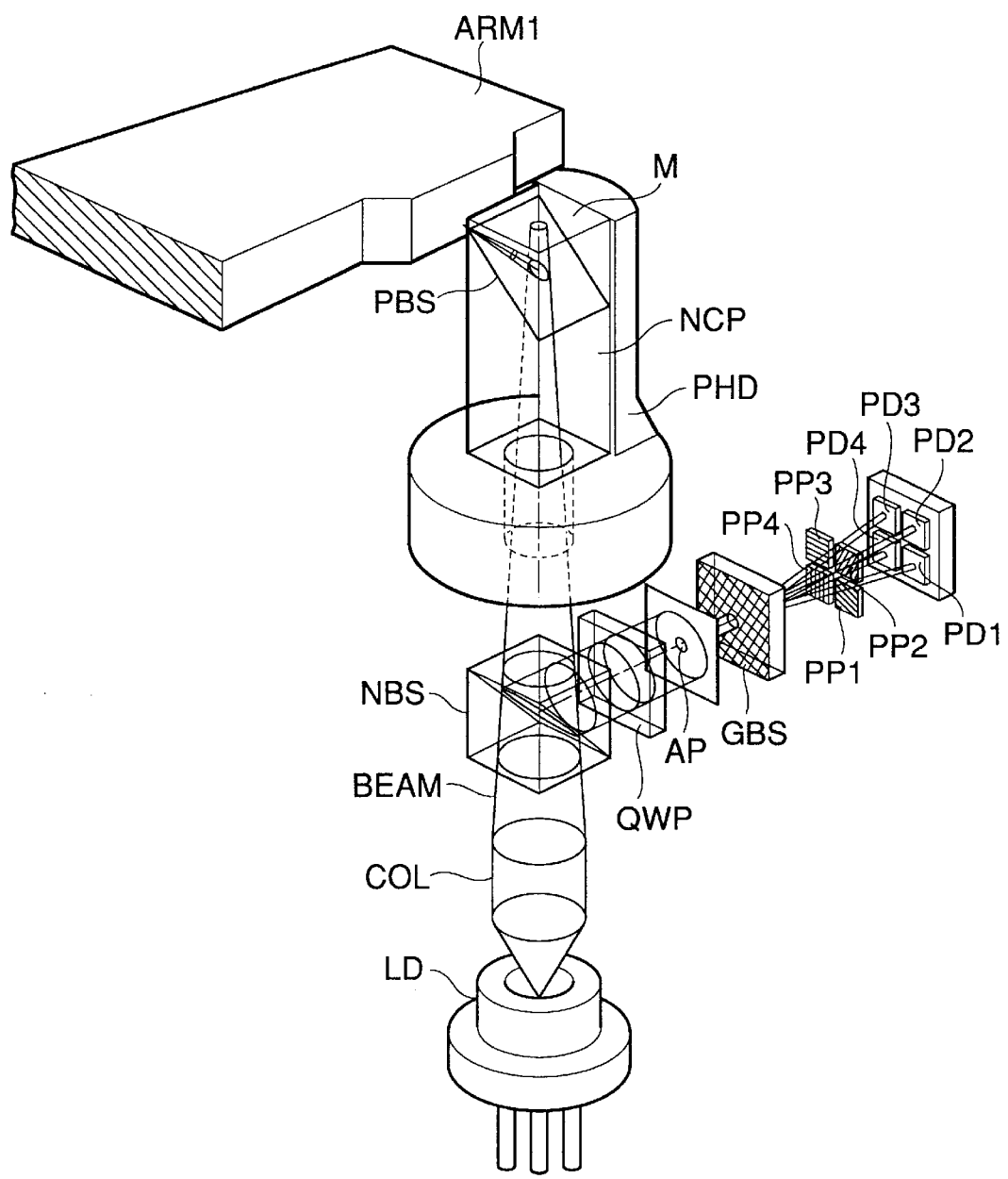
FIG. 6 is an illustration of the optical type non-contact distance sensor unit and probe holder of a servo track signal writing-in apparatus according to Embodiment 4 of the present invention.

FIG. 6 is an illustration of the construction of an optical system according to Embodiment 4 in which the probe-like polarizing prism holder PHD has been changed in shape. In the other points, the construction of this embodiment is similar to that of the aforedescribed Embodiment 1 and therefore need not be shown and described.

In the present embodiment, the D-shaped holding portions are singularized and the contacting portion is made into a cylindrical surface. By adopting such construction, even if there is more or less alignment deviation between the optical probe-like polarizing prism holder PHD and the surface of the hard disc HD, the contact position will become constant and the reproducibility of the initial position can be made splendid.

What is claimed is:

1. An apparatus comprising:
    a first system for forming a composite light beam of two light beams to be made to interfere with each other;
    a selecting member for selecting an approximately central portion of the composite light beam in order to obtain substantially a plane wave portion;
    a splitting member for amplitude-splitting the central portion of the composite light beam into three or more split light beams in the same area; and
    a second system for obtaining interference light beams of different phases from the three or more split light beams.

2. An apparatus according to claim 1, wherein said splitting member has a diffraction grating having diffracting action in each of two different directions, and the three or more split light beams are diffracted lights equal in the absolute value of order created from said diffraction grating.

3. The apparatus according to claim 1, wherein said first system causes at least one of the two light beams, used to form the composite light beam, to pass an object of which the displacement is to be measured, said apparatus further comprises a detecting portion for detecting the interference light beams of different phases, and the relative displacement information between said apparatus and the object is obtained from the detection by said detecting portion.

4. An apparatus comprising:
    a light transmitting member;
    an optical system for splitting a convergent light beam in said light transmitting member causing one of the split light beams to travel and return along a first route between a splitting position and a predetermined plane lying in the space outside said light transmitting member by roughly condensing it on the plane, and causing the other of the split light beams to travel and return along a second route of an optical path length substantially equal to that of the first route, thereby combining the returned light beams;
    a selecting member for selecting an approximately central portion of the combined light beam in order to obtain substantially a plane wave portion; and
    a system for amplitude-splitting the selected portion of the combined light beam in the same area to thereby obtain a plurality of split light beams, and obtaining interference light beams of different phases from the plurality of split light beams.

5. The apparatus according to claim 4, wherein the predetermined plane is a plane on an object of which the displacement is to be measured, said apparatus further comprises a detecting portion for detecting the portion of the combined light beam selected by said selecting member, and the relative displacement information between the apparatus and the object is obtained from the detection by said detecting portion.

6. An apparatus for effecting information recording on a hard disc drive device comprising:
    a light transmitting member;
    an optical system for splitting a convergent light beam in said light transmitting member, causing one of the split light beams to travel and return along the route between a splitting position and a side of an arm for a recording reading head in the hard disc drive device lying in the space outside said light transmitting member by roughly condensing it on the side, and causing the other of the split light beams to travel and return along a route of a wave motion optical path length substantially equal to the route in said light transmitting member, and superposing the split light beams after return, thereby obtaining a combined light beam;
    a selecting member for selecting an approximately central portion of the combined light beam in order to obtain an interference fringe portion with substantially the same phase;
    a detecting portion for detecting the part of the combined light beam selected by said selecting member;
    a control system for effecting the positioning of the arm on the basis of the result of the detection by said detecting portion; and
    signal writing-in means for writing a signal into a hard disc through the recording reading head each time the arm is positioned.

7. The apparatus according to claim 6, wherein said control system effects control for keeping the spacing between the arm and said optical system constant, and displaces said optical system in conformity with a position on the hard disc to be recorded.

8. An apparatus comprising:
    a multimode laser diode emitting a light beam;
    a first system having a polarizing separating element and a reference reflecting surface, and for splitting the light beam from said laser diode into two linearly polarized light beams of which the planes of polarization are orthogonal to each other by the use of said polarizing separating element, condensing and applying one of the linearly polarized light beams to a reflecting surface movable relative to said apparatus and reflecting it by said reflecting surface, reflecting the other of the linearly polarized light beams by said reference reflecting surface, and combining both of the linearly polarized light beams after the reflection by said polarizing separating element into a composite light beam;
    a quarter wavelength plate disposed in the optical path of travel of the composite light beam;

a splitting member for amplitude-splitting the composite light beam passed through said quarter wavelength plate;

polarizing plates disposed in the optical paths of travel of the plurality of split light beams with the azimuths thereof deviated from each other, interference light beams of different phases being obtained from respective ones of said polarizing plates; and light receiving elements for detecting respective ones of the interference light beams, wherein the relative displacement information of said apparatus and said reflecting surface is obtained from the detection by each of said light receiving elements, and wherein design is made such that (i) wave motion optical path length differences of the respective optical paths of the linearly polarized light beams in said first system are equal to each other and (ii) imaging optical path length differences of the optical paths substantially differ from each other.

9. The apparatus according to claim 8, wherein said splitting member has a diffraction grating.

10. The apparatus according to claim 8, wherein said reference reflecting surface is provided on a light transmitting member constituting said polarizing separating element.

11. The apparatus according to claim 8, wherein the other of the linearly polarized light beams is reflected by said reference reflecting surface at a position deviating from beam waist, and said apparatus further comprises an opening for selectively transmitting therethrough a part of a composite light beam combined by said polarizing separating element and making it into a substantially plane wave, and thereafter directing it to said splitting member.

12. The apparatus according to claim 8, further comprising non-polarized light splitting means on the optical path between said light source and said polarizing separating element, and wherein the composite light beam is directed in a direction discrete from said light source by said non-polarized light splitting means.

13. The apparatus according to claim 8, further comprising means for effecting the positioning of an object having said reflecting surface on the basis of the detection by each of said light receiving elements.

* * * * *

UNITED STATES PATENT AND TRADEMARK OFFICE
CERTIFICATE OF CORRECTION

PATENT NO. : 6,631,047 B2
DATED : October 7, 2003
INVENTOR(S) : Kou Ishizuka et al.

It is certified that error appears in the above-identified patent and that said Letters Patent is hereby corrected as shown below:

<u>Column 11,</u>
Line 38, "by" should read -- by a --.

<u>Column 15,</u>
Line 41, "An" should read -- The --.

Signed and Sealed this

Second Day of March, 2004

JON W. DUDAS
*Acting Director of the United States Patent and Trademark Office*